United States Patent
Anich

(10) Patent No.: US 9,739,505 B1
(45) Date of Patent: Aug. 22, 2017

(54) SOLAR TRACKING AND SOLAR ENERGY COLLECTION APPARATUS AND METHOD OF USING

(71) Applicant: Phillip Rudolph Anich, Ashland, WI (US)

(72) Inventor: Phillip Rudolph Anich, Ashland, WI (US)

(*) Notice: Subject to any disclaimer, the term of this patent is extended or adjusted under 35 U.S.C. 154(b) by 514 days.

(21) Appl. No.: 14/280,584

(22) Filed: May 17, 2014

(51) Int. Cl.
| | | |
|---|---|---|
| F24J 2/38 | (2014.01) | |
| G02B 26/08 | (2006.01) | |
| F24J 2/34 | (2006.01) | |
| G02B 3/08 | (2006.01) | |
| G02B 19/00 | (2006.01) | |

(52) U.S. Cl.
CPC . *F24J 2/38* (2013.01); *F24J 2/34* (2013.01); *G02B 26/0875* (2013.01); *G02B 3/08* (2013.01); *G02B 19/0009* (2013.01); *G02B 19/0042* (2013.01)

(58) Field of Classification Search
CPC  F24J 2/085; F24J 2/5417; F24J 2/5413; F24J 2/54; F24J 2/5431; F24J 2/542; F24J 2/5424; F24J 2/5427; F24J 2/38; F24J 2/34; F24J 2/16; F24J 2/062; F24J 2/08
See application file for complete search history.

(56) References Cited

U.S. PATENT DOCUMENTS

| | | |
|---|---|---|
| 3,977,773 A | 8/1976 | Hubbard |
| 4,132,223 A * | 1/1979 | Reddell ............... F24J 2/14 126/601 |
| 4,165,734 A | 8/1979 | Schmidt |
| 4,172,443 A * | 10/1979 | Sommer ............... F24J 2/10 126/578 |
| 4,194,492 A * | 3/1980 | Tremblay ............. F24J 2/10 126/601 |
| 4,220,136 A * | 9/1980 | Penney ............... F24J 2/0015 126/600 |
| 4,249,511 A | 2/1981 | Krisst et al. |
| 4,352,350 A * | 10/1982 | Johnson ............... F24J 2/08 126/579 |
| 4,546,756 A | 10/1985 | Leroy et al. |
| 5,275,149 A | 1/1994 | Ludlow |

(Continued)

OTHER PUBLICATIONS

David Gordon Wilson, Development and Optimization of a Thermal-Storage Solar Cooker, MIT Room 3-256, Cambridget, MA 02139, Undated, US Publication.

*Primary Examiner* — Jason Lau
(74) *Attorney, Agent, or Firm* — Richard C. Emery

(57) ABSTRACT

The invention is directed to a solar tracking apparatus that with permanent adjustment for latitude and pre-operation seasonal adjustment, when aimed at the Sun, will with rotation alone, track the Sun. The apparatus defines a permanently polar axis aligned shaft which rotates by the force of a weighted hydraulic timed drive continuously or intermittently at a rate simulating the apparent approximate fifteen degree per hour movement of the Sun across the sky. A two-ended carriage is fitted with a Fresnel lens or other solar concentrating or collecting element on one end and a targeted receiver is fitted to the other end. The carriage is adjustably mounted to about twenty three degrees either side of perpendicular to the polar aligned shaft thus focusing and concentrating the solar radiation on a receiving device, which stores the solar energy in the form of heat.

5 Claims, 8 Drawing Sheets

(56) References Cited

U.S. PATENT DOCUMENTS

| | | | |
|---|---|---|---|
| 5,632,823 A | 5/1997 | Sharan | |
| 6,284,968 B1 | 9/2001 | Niesyn | |
| 8,151,787 B1 | 4/2012 | Sivert | |
| 8,322,332 B2 | 12/2012 | Rogers | |
| 2009/0272425 A1* | 11/2009 | Green | F24J 2/07 |
| | | | 136/246 |
| 2010/0326427 A1 | 12/2010 | Chen | |

* cited by examiner

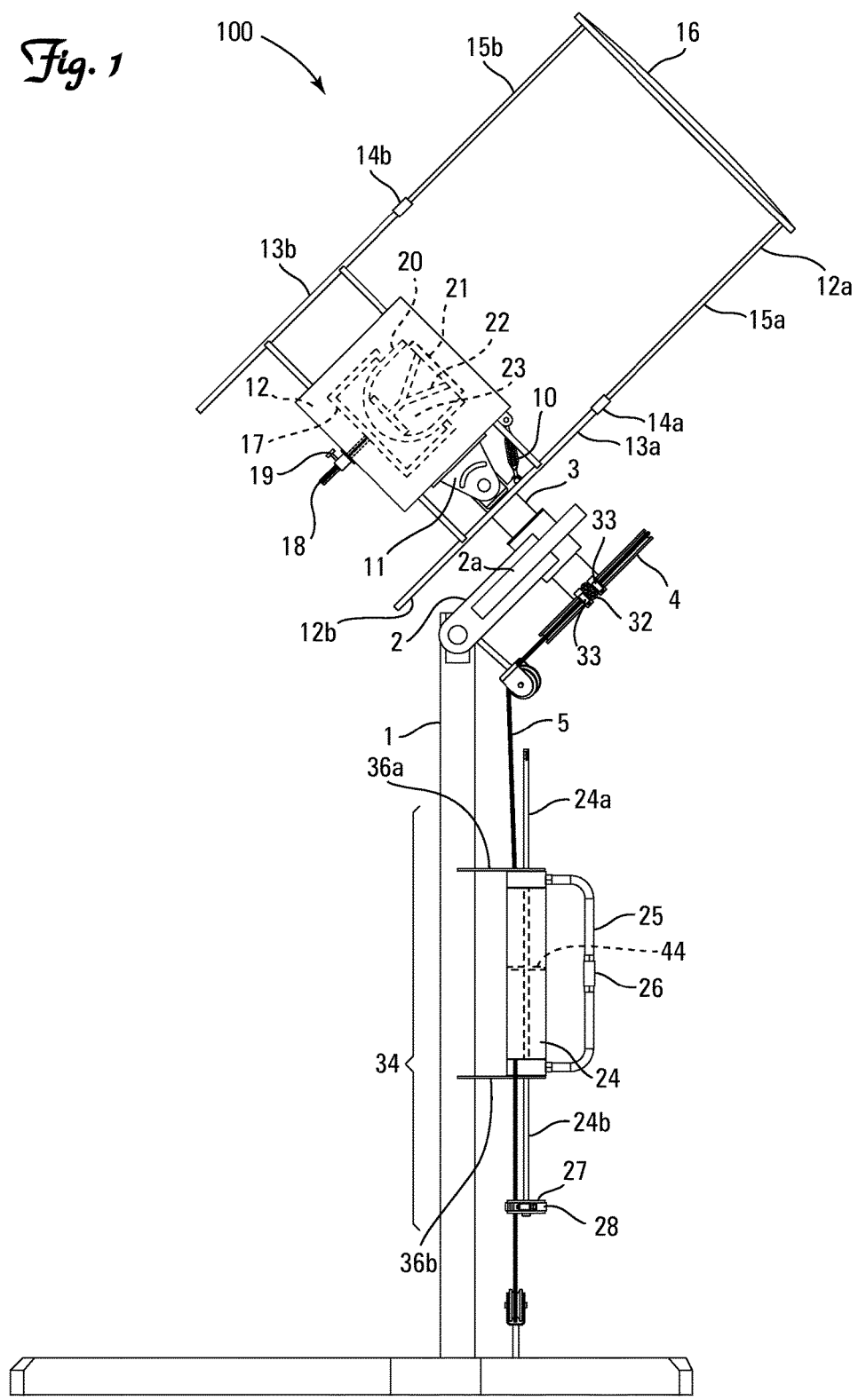

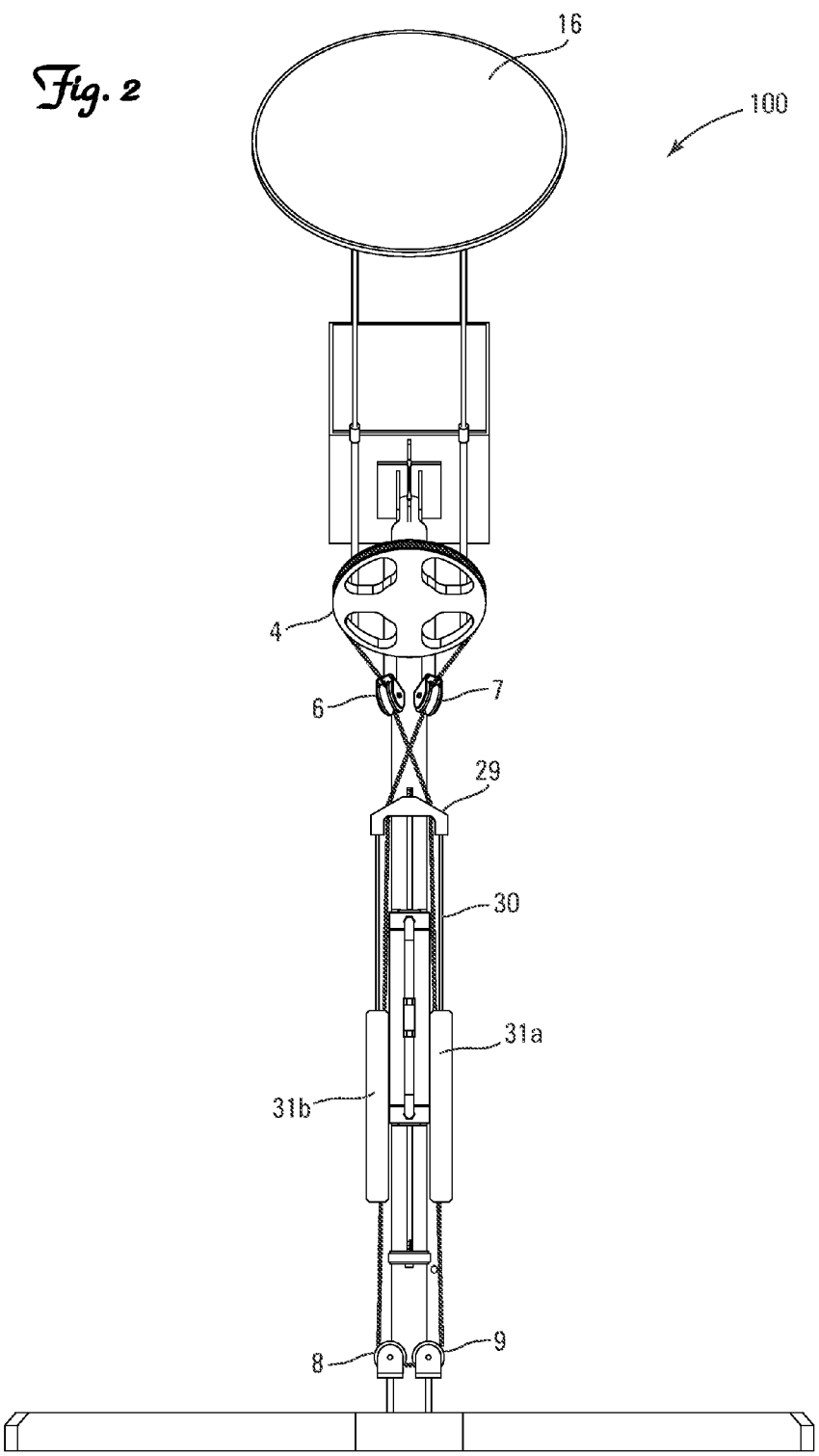

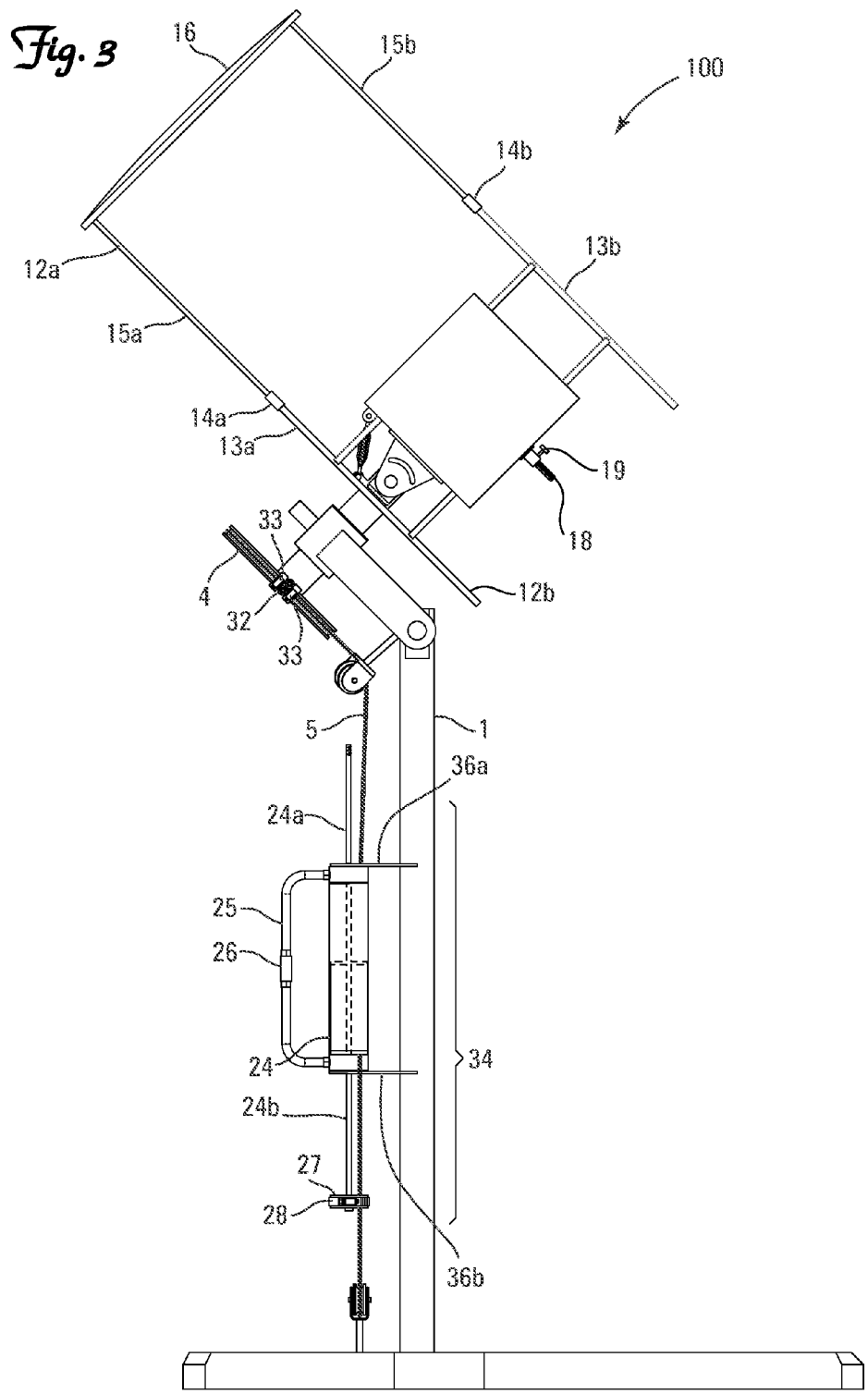

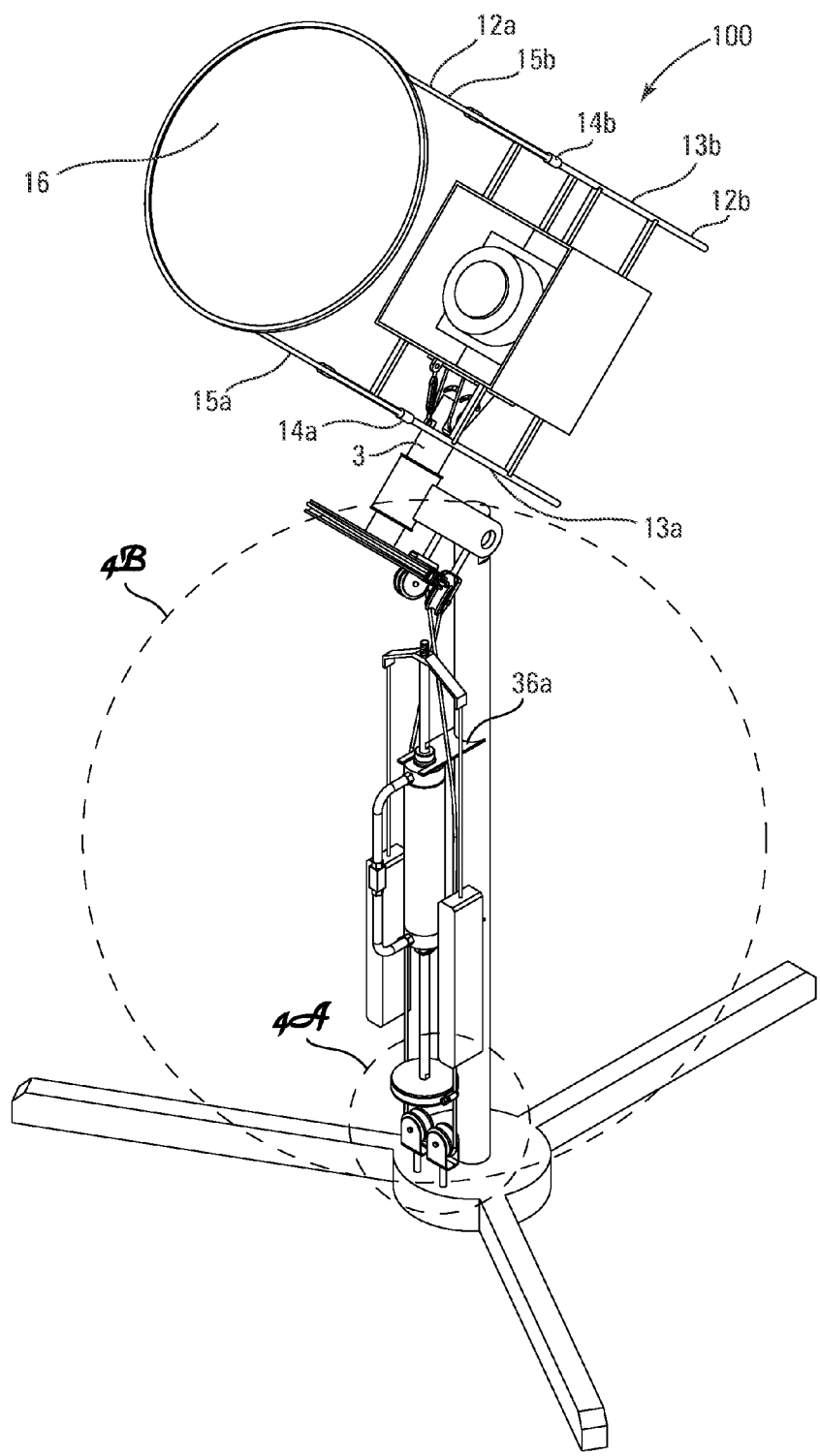

SOLAR TRACKING AND SOLAR ENERGY COLLECTION APPARATUS AND METHOD OF USING

This application claims the benefit as provided by 35 U.S.C. 119(e) of provisional application No. 61/937,396, filed Feb. 7, 2014 under 35 U.S.C. 111(b).

FIELD OF THE INVENTION

The invention relates to apparatus used to track the sun to collect and store solar energy.

BACKGROUND

Different solar tracking mechanisms have been developed to track the sun to collect and/or convert solar energy as a "free" form of energy. U.S. Pat. Nos. 3,977,773, 4,165,734, 4,249,511, 4,546,756, 5,275,149, 5,632,823, 6,284,968, 8,151,787, 8,322,332 and published U.S. patent application US 2010/0326427 A1 all teach devices performing this function but most utilize parabolic receivers or complex drive systems requiring multiple electric motors controlled by processors and sophisticated software all requiring absolute uninterrupted electrical power. With much of the developing world cooking with wood, thus depleting their local forests with 2,000,000 deaths each year from smoke inhalation and continual loss of carbon sequestration, clearly an inexpensive alternative is called for. In remote regions of the world with no existing or reliable electrical service, use of motorized devices is a near impossible alternative. What is clearly needed then is a non electrical tracking device that can be set up and operated anywhere and that is simple to use and inexpensive to produce and distribute.

BRIEF DESCRIPTION OF THE DRAWINGS

FIG. 1 is a side view of an embodiment of the invention.
FIG. 2 is a front view of the embodiment of the invention shown in FIG. 1.
FIG. 3 is an opposite side view of the embodiment of the invention shown in FIG. 1.
FIG. 4 is a perspective view of the embodiment of the invention shown in FIG. 1.

DETAILED DESCRIPTION

Figure 1A:
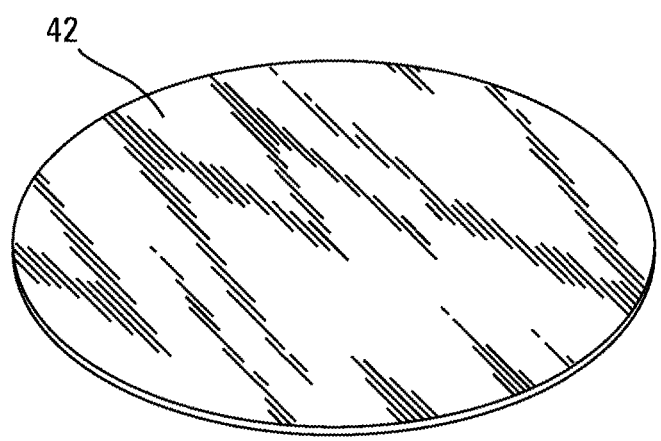
FIG. 1A is a perspective view of a Fresnel lens.

The particulars shown herein are by way of example and for purposes of illustrative discussion of the invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

NOMENCLATURE

100 Device
1 Stand
2 Latitude Adjustment Mount
2a Polar Alignment Sight
3 Polar alignable Shaft
4 Primary Sheave
5 Wire Rope
6 Left Top Pulley
7 Right Top Pulley
8 Left Lower Pulley
9 Right Lower Pulley
10 Solar Elevation Turnbuckle
11 Seasonal Adjustment Mount
12 Carriage
12a First End of Carriage
12b Second End of Carriage
13a First Carriage Leg
13b Second Carriage Leg
14a First Carriage Leg Twist Lock
14b Second Carriage Leg Twist Lock
15a First Telescoping Leg Adjustment
15b Second Telescoping Leg Adjustment
16 Solar Energy Collecting Element
17 Carriage Rack
18 Carriage Rack Depth Post
19 Carriage Rack Adjustment Set Screw
20 Insulated Vessel
21 Cavity Receiver Cover
22 Cavity Receiver
23 Insulated Vessel Chamber
24 Cylinder
24a First Rod
24b Second Rod
25 Hydraulic Hose
26 Valve
27 Threaded Block
28 Block Hose Clamp
29 Weight Suspension Cap
30 Weight Cable
31a First Weight
31b Second Weight
32 Cable Clamp
33 Hose Clamps
34 Hydraulic Timing Control
36a Upper Fork Mount
36b Lower Fork Mount
42 Fresnel Lens
44 Piston
200 Device
101 Stand
102 Polar-Aligned Support Shaft
103 Swivel Set Screw
104 Stand Swivel Post
105 Latitude Adjustment Mount
106 Polaris Alignment Sight
108 Motor
110 Solar Elevation Turnbuckle
111 Seasonal Adjustment Mount
112 Carriage
112a First End of Carriage
112b Second End of Carriage 113a First Carriage Leg
113b Second Carriage Leg
114a First Carriage Leg Twist Lock
114b Second Carriage Leg Twist Lock
115a First Telescoping Leg Adjustment
115b Second Telescoping Leg Adjustment
116 Solar Energy Collecting/Concentrating Element (Generic)
117 Carriage Rack
118 Carriage Rack Depth Post
119 Carriage Rack Adjustment Set Screw
120 Insulated Vessel
121 Cavity Receiver Cover
122 Cavity Receiver
123 Insulated Vessel Chamber
142 Lens
300 Device
201 Stand
202 Latitude Adjustment Mount
202a Latitude Adjustment Gauge
203 Polar alignable Shaft
206 Latitude adjustment Sight
207 Rotation Adjustment Twist Lock/Gauge
208 Motor
209 Compass
210 Solar Elevation Turnbuckle
211 Solar Elevation Gauge
212 Carriage
212a First End of Carriage
212b Second End of Carriage
213 Laser Pointer
214 View Port
215 Carriage Rack with Depth Post and Set Screw
216 Generic Solar Energy Collection Element Mount
218 Focal Target Definitions "Analemma" refers to a curve representing the changing angular offset of a celestial body (in this case the sun) from its mean position of the celestial sphere as viewed from another celestial body (in this case the earth). The analemma is a closed curve which does not change. Because of the Earth's annual revolution around the Sun in an orbit that is elliptical and tilted relative to the plane of the equator, an observer at a fixed point on the Earth sees the Sun appear to move in an analemma around a mean position, taking a year to do so.

"Equinox" refers to a celestial phenomenon wherein twice a year (around March 20 and September 22) the plane of the Earth's equator passes the center of the Sun. It is commonly known as the times of year when the hours of light and dark during a day are equal.

"Fresnel Lens" refers to a flat, relatively thin lens having a large aperture and short focal length. The Fresnel lens has a plurality of spherical arcs inscribed into it, resulting in light being focused on a single point.

"Polaris" refers to a star (_UMI, _Ursae Minoris, Aplha Ursae Minoris) in the Milky Way galaxy commonly known as the North Star, Northern Star, Pole Star, also Lodestar, sometimes Guiding Star. It is the brightest star in the constellation Ursa Minor and is very close to the north celestial pole of Earth, making it the current northern pole star.

"Solstice" refers to the time of year when the seasonal movement of the Sun's path (as seen from Earth) comes to a stop before reversing direction. The summer solstice is the day with the most daylight and occurs around June 21 and the winter solstice is the day with the least daylight and occurs around December 21.

Construction

The invention relates to a device 100, 200, 300 used for tracking the path of the sun, resulting in the collection of solar energy. As shown in FIG. 1 in one embodiment the device 100 can be fitted with a solar energy collecting element 16, which focuses the sun's rays on a carriage 12 which can vary in nature to hold and house a solar collection, concentration or conversion receiver. In one embodiment (not shown) the solar energy collecting element can be a Fresnel lens 42 as shown in FIG. 1A, or other collection or focusing device. In all these embodiments the device 100, 200, 300 can be fitted with a photovoltaic cell (not shown) or a combination of the two to generate electrical energy.

The device 100 is mounted on a stand 1 which serves to raise it from the ground. The stand 1 can be either permanently mounted in the ground or concrete etc. or affixed to a base which would allow repositioning the device 100 and/or allow it to be moved to a different location. A carriage 12 is mounted on a polar alignable shaft 3. The carriage 12 serves to house and secure the solar energy collecting element 16 at an adjustable distance through the cavity receiver cover 21, to the cavity receiver 22 of the insulated vessel 20 or other latent energy storage vessel. In an alternative embodiment the latent energy storage vessel could be a flat plate (not shown). The cavity receiver 22 can contain any liquid or solid material including that which exhibits thermal-storage phase change characteristics whose temperature will increase as a result of concentrated perpendicular sun rays striking it and only slowly release the heat. Inorganic materials possessing the desired characteristics include bismuth, iron chloride, lithium nitrate, potassium nitrate, rhenium pentoxide, sodium nitrate, tin and zinc chloride. Organic materials include pChlorobenzoic acid, pNitrobenzoic acid, carbazole, anthraquinone and anthracene. It is understood that additional materials capable of absorbing high amounts of heat while not breaking down and later slowly releasing the heat also exist and that therefore the above lists of inorganic and organic materials is considered to be illustrative and therefore not limiting the scope of the invention.

Figure 5:
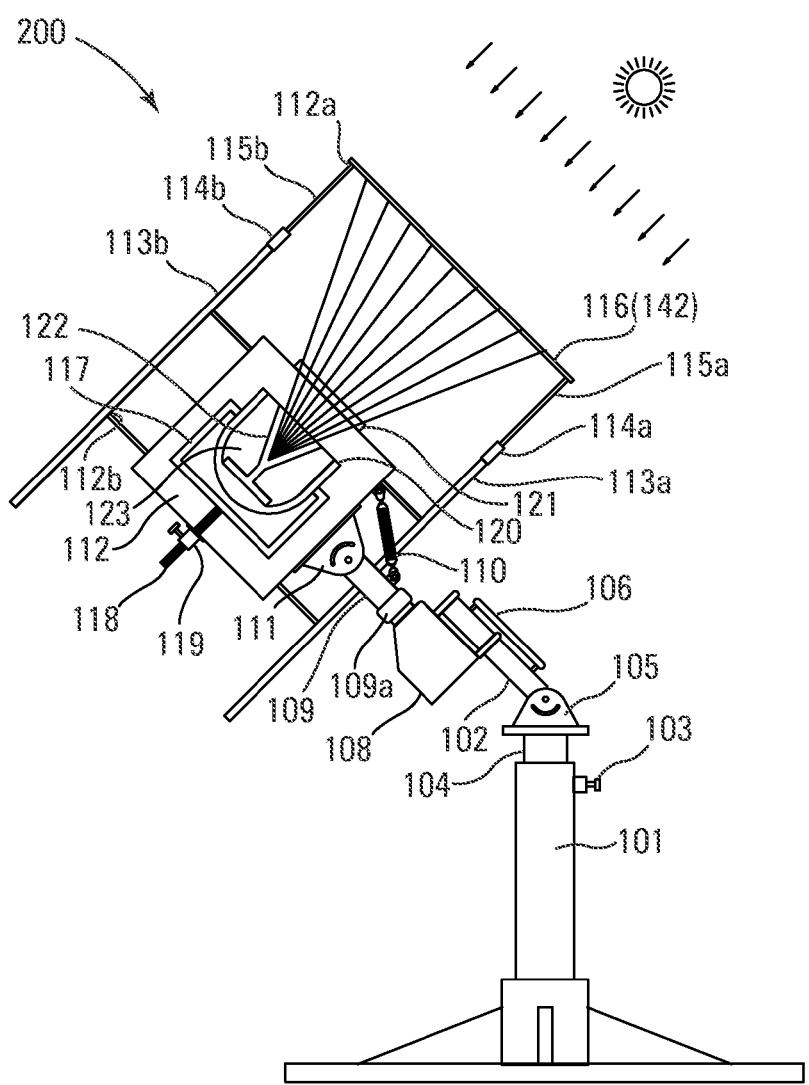
FIG. 5 is a side view of an alternative, electrically driven embodiment of the invention.
Figure 6:
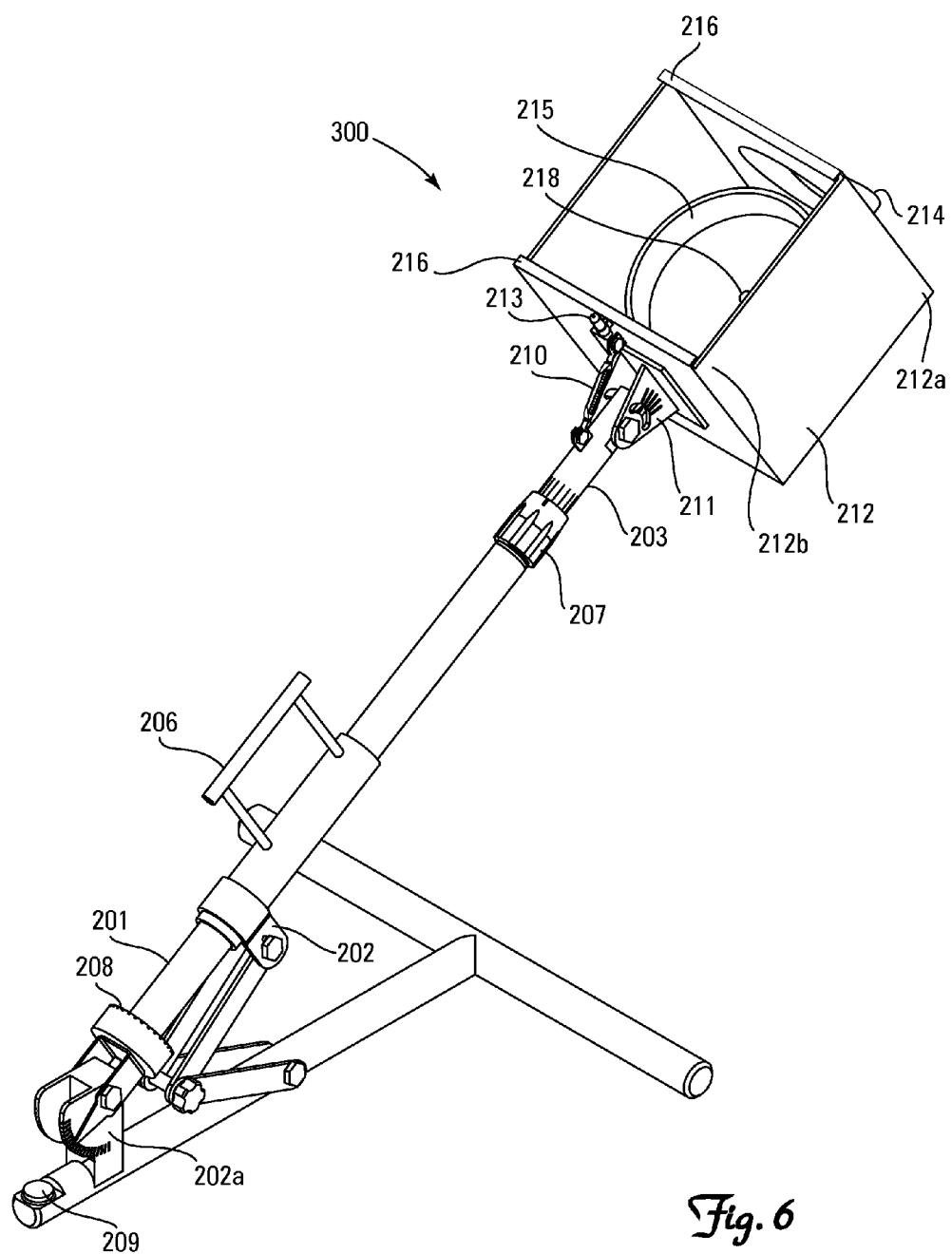
FIG. 6 is a perspective view of another embodiment of the invention having gauges used to align or Interpret the settings of the device.

The position of the solar energy collecting element 16 with regard to the distance between it and the targeted insulated vessel 20 is adjustable by moving an adjustable depth post system connected to the carriage rack 17 or by using a telescoping leg adjustment mechanism which comprises a first telescoping leg adjustment 15a and a second telescoping leg adjustment 15b in conjunction with a first carriage leg 13a and first carriage leg twist lock 14b and second carriage leg 13b and second twist lock 14b which allows the distance between the carriage 12 and the solar energy collecting element 16 to be varied and secured. A polar alignable shaft 3 is attached to a rotational mechanism (unnumbered) which rotates the polar alignable shaft 3 and attached carriage 12 at a rate of 15 degrees per hour, which matches the apparent movement of the sun. In one embodiment, a weight driven device (unnumbered) with hydraulic timing control 34 is used to rotate the device 100, which is discussed in detail below. In other embodiments 200, 300 as shown in FIG. 5 and FIG. 6, an electric motor 108, 208 is used to rotate the carriage 112, 212.

In the embodiment shown in FIGS. 1-4B, the carriage 12 is adjustably mounted to a first end (unnumbered) of the polar alignable shaft 3 which is itself rotatably attached to a latitude adjustment mount 2. A second end of the polar alignable shaft 3 is fixedly attached to a primary sheave 4, which, due to its fixed attachment, rotates the carriage 12 when bias is applied, as explained below. A wire rope 5 or other flexible line defining a first end (unnumbered) and a second end (unnumbered) extends around the primary sheave 4 which is rotatably mounted to the carriage 12 and its attachments as discussed above. The second end (unnumbered) of the wire rope 5 is attached to a threaded block 27 by means of a hose clamp 28, which is attached to a hydraulic cylinder 24, which provides the rotation regulation function, as explained in more detail below. When a bias is applied to the primary sheave 4 via the wire rope 5 as explained below, the attached carriage 12 will rotate, thus following the Sun across the sky. As seen in FIG. 2, the wire rope 5 is fed through a pulley system comprising a left top pulley 6, right top pulley 7, left lower pulley 8, and right lower pulley 9 to guide the path of the wire rope 5.

Figure 4B:
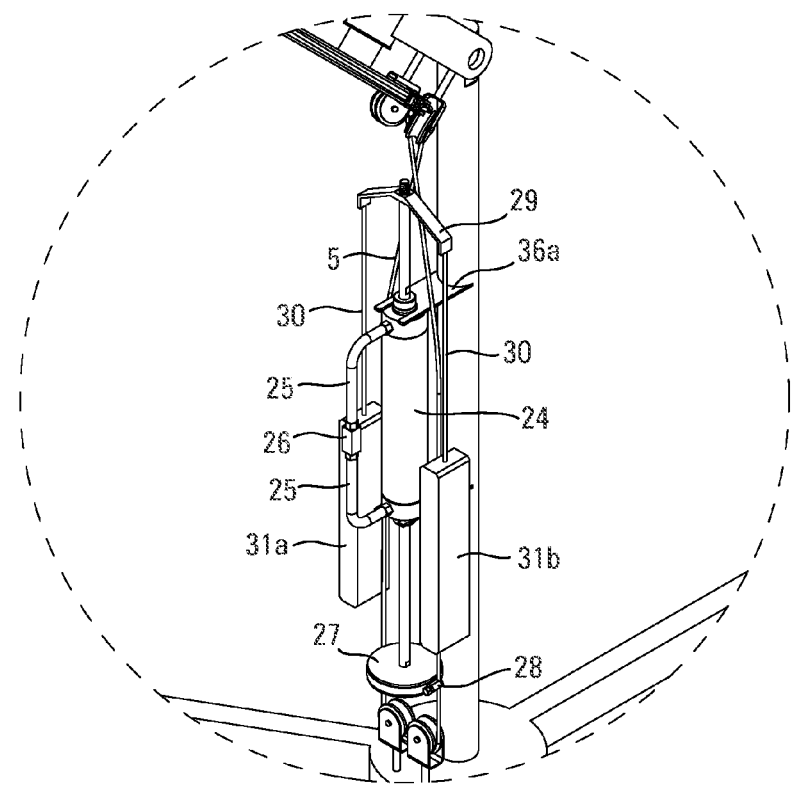
FIG. 4b is a perspective view of the detail of the invention shown in circle 4B around a portion of FIG. 4.
Figure 4A:
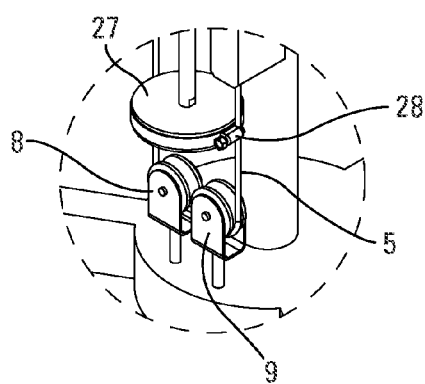
FIG. 4a is a perspective view of the detail of the invention shown in circle 4A around a portion of FIG. 4.

The rotation of the carriage 12 and its attachments are controlled by the use of a hydraulic cylinder 24 timing control system as best shown in FIG. 4B. A hydraulic cylinder 24 is attached to the stand 1. The hydraulic cylinder 24 houses a piston 44 and a first rod 24a attached to the piston 44 which extends out the top end of the cylinder 24 upward and a second rod 24b also attached to the piston 44 which extends from the bottom of the cylinder 24 toward the ground. A first weight 31a is attached to a first end (unnumbered) of a weight cable 30 and a second weight is likewise attached to a second end (unnumbered) of the weight cable 30. The weight cable 30 and first 31a and second weights 31b are attached to the top of the first rod 24a and apply a bias tending to force the first rod 24a and piston downward. A hydraulic hose 25 connects the area inside the cylinder 24 on the top side of the piston 44 with the area inside the cylinder 24 on the bottom side of the piston 44 allowing hydraulic fluid to flow from the area on the bottom side of the cylinder 24 through the hydraulic hose 25 to the area on the top side of the cylinder 24. An adjustable valve 26 allows adjustment of the rate of downward movement of the piston 44, thereby controlling the rate of descent of the weights 31 and weight cable 30.

The adjacent second-side parallel run (unnumbered) of the wire rope 5 is attached to a threaded block 27 by means of a block hose clamp 28. The wire rope 5 is threaded first through the right lower pulley 9, the left lower pulley 8, up the length of the stand 1. Next, the wire rope 5 is threaded through the right top pulley 7 and around the primary sheave 4, through the left top pulley 6 and back down the length of the stand 1. The ends (unnumbered) of the wire rope 5 meet at the primary sheave and are secured together by a cable clamp 32 and trapped in position on the sheave by adjacent hose clamps. As the weights 31a, 31b force the piston 44 downward the piston 44 displaces hydraulic fluid through the hydraulic hose 25 at a rate controlled by the adjustable valve 26 from the part of the interior on the bottom side of the interior of the hydraulic cylinder 24 to the part of the interior on the top side of the interior of the hydraulic cylinder 24. The second side parallel run (unnumbered) of the wire rope 5 which is attached to the threaded block 27 is pulled in a downward manner, causing the primary sheave 4 and attachments to rotate at a predetermined, controlled rate.

Operation

Pre-Operation

In the embodiment shown in FIGS. 1-4B with the device 100 permanently polar-aligned and fully assembled, two initial adjustments must be made with each use. First the elevation of the carriage 12 must be adjusted using the solar elevation turnbuckle 10. Second, a cable clamp 32, attached to the wire rope 5, trapped by hose clamps 33 on each side, is freed from its fixed position along the edge of the primary sheave 4 by loosening the hose clamps 33 and the primary sheave 4 is then rotated in the necessary direction independent of the wire rope 5 to aim the device at the Sun. Once adjusted the hose clamps 33 are tightened to again fix the primary sheave 4 in position along the wire rope 5. These two adjustments are to position the face of the solar energy collecting element 16 perpendicular to the sun's rays. For example, when using a Fresnel lens 42 the corrected adjustment places concentrated sunlight on the target receiver. With these two adjustments made, the weights 31a, 31b, and attached weight suspension cap 29 and weight cable 30 is attached to the top rod 24a.

In the motorized embodiments 200, 300 as shown in FIG. 5 and FIG. 6, with the device permanently polar-aligned and fully assembled two initial adjustments must be made with each use. First the elevation of the carriage 112, 212 must be adjusted using the solar elevation turnbuckle 110, 210. This adjustment compensates for changes in the season. Second a twist lock 109a, 207 is released and then reset after adjusting the rotation position. The second adjustment compensates for the changes in the equation of time. These two adjustments are to position the face of the solar energy collection element 116, 216 perpendicular to the sun's rays. For example, using a Fresnel lens 42 the corrected adjustment places concentrated sunlight on the target receiver.

Operation

In the embodiment 100 shown in FIG. 1, with the hydraulic assembly pushing down on the threaded block 27 connected by the block hose clamp 28 to the wire rope 5 the operator opens and adjusts the valve 26 which starts the movement of the device 100. The block 27 thus pulls down on the right run of the wire rope 5 causing the polar alignable shaft 3 to rotate. With proper polar alignment and correct elevation and rotation adjustments, rotation of the carriage 12 will track the sun. In the motorized embodiments 200, 300 an electric motor 108, 208 is programmed to rotate the device 200, 300 at the correct rate beginning at a programmed time. With proper polar alignment and correct elevation and rotation adjustments, rotation of the carriage 112, 212 at fifteen (15) degrees per hour will track the sun.

Post-Operation

When the upper cylinder rod 24a is fully depressed the block hose clamp 28 is removed from the block 27. The weights 31a, 31b, weight cable 30 and attached weight suspension cap 29 are lifted off the upper cylinder rod 24a and set aside. The hydraulic cylinder 24 is removed, rotated 180 degrees and set back into the fork mounts 36a, 36b. The weights 31a, 31b, weight cable 30 and attached weight suspension cap 29 and threaded block hose clamp 28 are then re-attached and once movement begins, both seasonal turnbuckle 10 and cable-repositioning rotational adjustments are made as necessary. If subsequent use of the device 100 is desired the same day, only the rotational adjustment is necessary for tracking.

Regarding the electrically powered embodiments 200, 300 the device is repositioned as necessary and reenergized to repeat the process.

FIG. 6 is a side view of another embodiment of the invention 300 having gauges 202a, 207, 211 used to align the device in another embodiment where the demonstration model may be fitted with various solar collecting/concentrating elements and energy/light analyzing devices. In this embodiment, adjustment of the device 300 can be made by observation or by calculation. When made by observation the 24-hour timer motor 208 must be adjusted to local solar time, the latitude angle is set using the latitude adjustment sight 206. Fitted with an appropriately sized Fresnel lens 42 or other solar energy collecting element 16 with the 24-hour timer motor 208 rotating the polar-aligned shaft 203 at 15 degrees per hour, the solar elevation turnbuckle 210 and the rotational adjustment twist lock 207 are adjusted to place the Fresnel lens 42 focal point on a targeted surface supported by the carriage rack 212. Once adjusted, readings can be made at the latitude gauge 202a to learn the local latitude, at the rotational adjustment gauge 207 to learn the current position along the equation of time and the solar elevation gauge 211 to learn the current solar elevation between the winter and summer solstice's. This can also be adjusted by calculation, use astronomical data to set each of the gauged variable adjustments: local solar time, local latitude, equation of time and solar elevation angle.

What is claimed is:

1. A solar tracking and energy collecting device, comprising:
    (a) a stand;
    (b) a polar alignable shaft rotatably mounted to the stand and a primary sheave fixedly mounted to the polar alignable shaft so the polar alignable shaft and primary sheave rotate together;
    (c) a carriage defining a first end and a second end mounted to the polar alignable shaft;
        (i) the carriage defining a first end and a second end and comprising a first carriage leg attached to a first telescoping leg adjustment which is longitudinally adjustable by a first twist lock, a second carriage leg attached to a second telescoping leg adjustment which is longitudinally adjustable by a second twist lock, allowing the position of the carriage to be varied;
    (d) a solar energy collecting element attached to the first end of the carriage to focus the sun's rays;
    (e) an insulated vessel located at the second end of the carriage for storing solar radiation;
    (f) a solar elevation turnbuckle for adjusting the angle of the carriage with relation to the sun;
    (g) a left top pulley, a right top pulley, a left lower pulley and a right lower pulley all attached to the stand;
    (h) a hydraulic cylinder attached to the stand having a first rod extending from the hydraulic cylinder and a second rod extending in an opposite direction from the first rod, the second rod attached to a threaded block, the first and second rods attached to a piston within the hydraulic cylinder, a hydraulic hose permitting fluid communication within the interior of the hydraulic cylinder and a valve attached to the hydraulic hose;
    (i) at least a single weight attached to a weight suspension cap which sits on the first rod the weight suspension cap attached to a line, the line attached at one side to the threaded block, the line threaded through the right lower pulley, left lower pulley, left top pulley, the line then runs over the exterior surface of the primary sheave, the right top pulley, the line forming a closed loop;
    wherein when the valve on the hydraulic cylinder is opened the at least single weight forces the first rod downward, applying a bias to the attached line, transferring energy to the primary sheave, causing the attached carriage to rotate.

2. The solar tracking and energy collecting device of claim 1 wherein the solar energy collecting element is a Fresnel lens.

3. The solar tracking and energy collecting device of claim 1 wherein two weights are attached to the hydraulic cylinder.

4. The solar tracking and energy collecting device of claim 3 wherein the weights are attached to and suspended from a weight suspension cap.

5. A method of using a solar tracking and energy collecting device, comprising the steps of:
    (a) aligning permanently a polar alignable shaft with the North star to align the polar alignable shaft with the Earth's axis;
    (b) freeing a cable clamp attached to a wire rope, trapped by a hose clamp on either side of the wire rope from a primary sheave;
    (c) rotating the primary sheave to aim a solar energy collecting element at the Sun;
    (d) fixing the cable clamp along the primary sheave by trapping it between the hose clamps and tightening the hose clamps;
    (e) adjusting the elevation of a carriage attached to the polar alignable shaft and the primary sheave using a solar elevation turnbuckle to position the solar energy collecting element attached to the carriage to be perpendicular to the sun's rays;
    (f) applying potential bias to the wire rope attached to the primary sheave by placing a weight suspension cap attached by a weight cable to a weight on top of a first rod extending from a hydraulic cylinder;
    (g) opening and adjusting a valve fitted to the hydraulic cylinder to control the speed of the descent of a second rod extending from the hydraulic cylinder and an attached threaded block which is attached to the wire rope by a block hose clamp; and
    (h) applying bias to the wire rope attached to the primary sheave thus rotating the carriage to track the sun.

* * * * *